(12) United States Patent
Ma et al.

(10) Patent No.: US 11,283,254 B2
(45) Date of Patent: Mar. 22, 2022

(54) CROSS ARM AND ANGLE TOWER AND TENSION TOWER COMPRISING THE SAME

(71) Applicant: Jiangsu Shemar Electric Co., Ltd., Nantong (CN)

(72) Inventors: Bin Ma, Nantong (CN); Jie Yu, Nantong (CN); Dequan Li, Nantong (CN)

(73) Assignee: SHANGHAI SHEMAR POWER ENGINEERING CO., LTD

( * ) Notice: Subject to any disclaimer, the term of this patent is extended or adjusted under 35 U.S.C. 154(b) by 472 days.

(21) Appl. No.: 16/320,346

(22) PCT Filed: Jul. 21, 2017

(86) PCT No.: PCT/CN2017/093791
§ 371 (c)(1),
(2) Date: Jan. 24, 2019

(87) PCT Pub. No.: WO2018/019180
PCT Pub. Date: Feb. 1, 2018

(65) Prior Publication Data
US 2019/0267787 A1 Aug. 29, 2019

(30) Foreign Application Priority Data

Jul. 26, 2016 (CN) .......................... 201610594229.1
Jul. 26, 2016 (CN) .......................... 201610597271.9

(51) Int. Cl.
*H02G 7/20* (2006.01)
*E04H 12/24* (2006.01)
(Continued)

(52) U.S. Cl.
CPC ............... *H02G 7/20* (2013.01); *E04H 12/24* (2013.01); *H02G 7/02* (2013.01); *H02G 7/05* (2013.01)

(58) Field of Classification Search
CPC .. H02G 1/02; H02G 7/05; H02G 1/04; H02G 7/20; H02G 7/00; H02G 7/053;
(Continued)

(56) References Cited

U.S. PATENT DOCUMENTS 2,149,875 A * 3/1939 Talbott ..................... H02G 7/05
248/63
2,741,321 A * 4/1956 Mccoy ................... H01B 17/44
174/144

(Continued)

FOREIGN PATENT DOCUMENTS

CN       201674193 U    12/2010
CN       202401815 U    8/2012
(Continued)

OTHER PUBLICATIONS

Extended European Search Report including the Written Opinion for Application No. EP 17833483.5 dated Apr. 17, 2020, 9 pages.
(Continued)

*Primary Examiner* — William H. Mayo, III
*Assistant Examiner* — Krystal Robinson
(74) *Attorney, Agent, or Firm* — Lerner, David, Littenberg, Krumholz & Mentlik, LLP

(57) ABSTRACT

Provided is a cross arm with one end connected to a tower body and a free end for connecting a conducting wire. Free end comprises an end connecting piece and an extension piece. Extension piece is fixed with end connecting piece. Extension piece protrudes horizontally from end connecting piece. Conducting wire is connected to extension piece. An angle between extension piece and a cross arm center line is greater than that between conducting wire and cross arm center line. Cross arm free end includes a jumper wire device horizontally arranged on end connecting piece for hitching jumper wire. Extension piece use increases distance
(Continued)

between conducting wire and tower body when turning angle condition is met. Gap requirement between conducting wire and tower body is met, and cross arm length increase is eliminated. Horizontally arranging jumper wire device on end connecting piece reduces distance between wire layers and tower body size.

19 Claims, 9 Drawing Sheets

(51) Int. Cl.
*H02G 7/02* (2006.01)
*H02G 7/05* (2006.01)

(58) Field of Classification Search
CPC .. H02G 3/24; H02G 7/02; H02G 7/16; H02G 1/14; H02G 3/0481; H02G 7/12; H02G 9/065; E04H 12/24; E04H 12/10; E04H 12/02; E04H 12/187; E04H 12/345; E04H 9/14; E04H 12/00; E04H 12/003; E04H 12/08; E04H 12/12; E04H 12/2269; E04H 12/2292; E04H 12/34; E04H 12/341; H01B 17/16; H01B 17/00; H01B 17/04; H01B 17/14; H01B 17/325; H01B 19/00; H01B 17/12; H01B 17/20; H01B 17/22; H01B 17/24; H01B 17/38; H01B 17/40; H01B 17/42; H01B 17/56; H01B 17/58; H01B 3/30; H01B 9/008
IPC ............ H02G 1/02,7/05, 1/04, 7/20, 7/00, H02G 7/053, 3/24, 7/02, 7/16, 1/14, 3/0481, 7/12, 9/065; E04H 12/24, 12/10, 12/02, 12/187, 12/345, 9/14, 12/00, 12/003, 12/08, 12/12, 12/2269, 12/2292, 12/34, 12/341; H01B 17/16, 17/00, 17/04, 17/14, 17/325, 19/00, 17/12, 17/20, 17/22, 1/24, 17/38, 17/40, 17/42, 17/56, 17/58, 3/30, 9/008
See application file for complete search history.

(56) References Cited

U.S. PATENT DOCUMENTS

| | | | | |
|---|---|---|---|---|
| 3,299,586 A * | 1/1967 | Hockaday | ................ | H02G 7/20 52/40 |
| 3,357,694 A * | 12/1967 | Kidder | ................... | H02G 7/14 267/70 |
| 4,025,824 A * | 5/1977 | Cheatham | ................ | H02B 5/02 361/601 |
| 4,409,429 A * | 10/1983 | Gaylard | ................... | H02G 7/05 174/43 |
| 4,523,054 A * | 6/1985 | Baker | ................... | H01B 17/00 174/148 |
| 4,823,022 A * | 4/1989 | Lindsey | ............... | H01B 17/005 307/149 |
| 4,867,399 A * | 9/1989 | Therond | ................ | E04H 12/24 248/65 |
| 8,895,861 B2 * | 11/2014 | Cotton | .................... | H02G 3/24 174/158 R |
| 2010/0276172 A1 | 11/2010 | Frenkel | | |
| 2015/0083483 A1 | 3/2015 | Fulk et al. | | |

FOREIGN PATENT DOCUMENTS

| | | |
|---|---|---|
| CN | 202788142 U | 3/2013 |
| CN | 202997476 U | 6/2013 |
| CN | 203412353 U | 1/2014 |
| CN | 103696613 A | 4/2014 |
| CN | 103835567 A | 6/2014 |
| CN | 104314355 A | 1/2015 |
| CN | 204497701 U | 7/2015 |
| CN | 105155908 A | 12/2015 |
| CN | 204920402 U | 12/2015 |
| CN | 105680390 A | 6/2016 |
| CN | 205908090 U | 1/2017 |
| CN | 205908096 U | 1/2017 |
| JP | H6276654 A | 9/1994 |
| JP | H1118260 A | 1/1999 |
| JP | H11127532 A | 5/1999 |
| JP | 2010263782 A | 11/2010 |
| KR | 100913253 B1 | 8/2009 |
| RU | 73905 U1 | 6/2008 |
| RU | 133179 U1 | 10/2013 |
| WO | 0077903 A1 | 12/2000 |
| WO | 0186772 A1 | 11/2001 |

OTHER PUBLICATIONS

Russian Search Report for Application No. 2019104467/03 dated Mar. 20, 2020, 2 pages.
First Search Report of Chinese Application No. 201610597271.9 dated Jul. 26, 2016.
First Search Report of Chinese Application No. 201610594229.1, filed Jul. 26, 2016.
International Search Report for PCT/CN2017/093791 dated Oct. 13, 2017.

* cited by examiner

CROSS ARM AND ANGLE TOWER AND TENSION TOWER COMPRISING THE SAME

CROSS REFERENCE TO RELATED APPLICATIONS

The present application is a national phase entry under 35 U.S.C. § 371 of International Application No. PCT/CN2017/093791, filed Jul. 21, 2017, which claims priority from Chinese Patent Application Nos. 201610597271.9, filed Jul. 26, 2016 and 201610594229.1, filed Jul. 26, 2016, all of which are hereby incorporated herein by reference.

TECHNICAL FIELD

The present disclosure relates to a technical field of power transmission and transformation devices, and more particularly, to a cross arm, and an angle tower and a tension tower including the same.

BACKGROUND

In an overhead transmission line, a transmission tower functions to support a conducting wire. Specifically, the conducting wire is supported by a cross arm fixed on the transmission tower. The specific connection means is hanging the conducting wire at a free end of the cross arm of the transmission tower.

An angle tower is a transmission tower used to change a route direction of a line when the route direction is required to be changed. As shown in FIG. 1, a conventional angle tower 10 has an outer corner 11 and an inner corner 12. The conducting wire 13 at the inner corner 12 tends to be away from the angle tower 10, and the conducting wire 14 at the outer corner 11 tends to approach first and then to be away from the angle tower 10. There is a requirement on a minimum electrical clearance between the conducting wire and the angle tower 10. Generally, the distance between the conducting wire and the angle tower 10 is increased by increasing the length of the cross arm to meet the electrical clearance requirement, but an excessively long cross arm multiplies the production difficulties.

A tension tower is commonly used to withstand unbalanced tension, and force on the conducting wire is generally transferred to the tower body by a tension tower. The tension tower includes a line tension tower, an angle tower and a terminal tower, which can withstand the horizontal load generated by conducting wires and ground wires. The conducting wires on both sides of the tension tower need to be connected by a jumper wire. As shown in FIG. 2, in a conventional tension tower 20, the jumper wire needs to be performed by using a tension insulator string 21 and related fittings. The use of the tension insulator string 21 and the fittings makes the vertical spacing between the cross arms 22 very large, and makes the tower head 23 have a complicated structure with a large size, which is inconvenient for maintenance and installation. It causes that the tension tower 20 is costly, the load caused by the conducting wire and the wind load on the tower head are large, and the tower body is heavy.

SUMMARY

In view of the disadvantages of the prior art, one objective of the present disclosure is to provide a cross arm which is used on an angle tower to support a conducting wire, so that the electrical clearance between the conducting wire and the tower body can be satisfied without increasing the length of the cross arm. Another objective of the present disclosure is to provide a cross arm that can be used on a tension tower to support a conducting wire, so that the tension insulators and complicated connections between fittings can be cancelled. Thus the interlayer spacing of the conducting wires is narrowed, and the size of the tower head of the tension tower is reduced. As a result, the structure is simplified and the cost is reduced.

In order to achieve the mentioned objectives, the present disclosure adopts the following technical solutions.

According to one aspect of present disclosure, a cross arm applied to an angle tower is provided. Said angle tower includes a tower body. An end of said cross arm is connected to said tower body, and another end of said cross arm away from said tower body is a free end for connecting a conducting wire. Said free end comprises an end connecting member and an elongate member fixed to said end connecting member. In a horizontal projection, said elongate member extends outward from said end connecting member. Said conducting wire is connected to said elongate member. An angle between said elongate member and a center line of said cross arm is greater than an angle between said conducting wire and said center line of said cross arm.

There is a requirement on a minimum electrical clearance between the conducting wire and the tower body. The electrical clearance is related to the shortest space distance from the conducting wire to the tower body. The minimum electrical clearance can avoid causing the flashover and assure the personal safety. According to the present disclosure, in the horizontal projection, said elongate member extends outward from said free end in a direction parallel with or away from said tower body, so the distance between two hanging points of two conducting wires at the corner can be increased. Then the distance between the conducting wire and the tower body can be increased, that is, the electrical clearance between the conducting wire and the tower body is increased without changing the length of the cross arm.

Preferably, said elongate member is arranged on both sides of said end connecting member. The two conducting wires at the corner can be hung on the elongate members arranged on the both sides of the end connecting member respectively, so that the distance between the conducting wire and the tower body can be increased.

Preferably, one said elongate member is arranged on said end connecting member, and two conducting wires at a corner are respectively connected to both ends of said elongate member. The elongate member can be mounted on the end connecting member as a whole, which only needs to be fixed to the free end.

Preferably, said elongate member is joined by a plurality of segments of supports. The appropriate number of supports may be chosen to assemble an elongate member with a desired length as required to meet the electrical clearance requirement between the conducting wire and the tower body. In addition, when the elongate member needs to be long, it is flexible to assemble such elongate member in a form of multi-segment supports.

Preferably, at least one reinforcing member is arranged on said elongate member. The arrangement of the reinforcing member can enhance the strength and structural stability of the elongate member.

Preferably, said at least one reinforcing member is connected to said end connecting member and said end connecting member. The reinforcing member, the elongate member and the end connecting member may form a stable triangular structure that further enhances the strength of the elongate member.

Preferably, at least one auxiliary member is arranged between said reinforcing member and said elongate member, and said auxiliary member is connected to said reinforcing member and said elongate member. The arrangement of the auxiliary member further increases the rigidity of the elongate member.

Preferably, said elongate member is arranged at an outer corner of said angle tower. At the outer corner, the conducting wire at the corner approaches first and moves away from the tower body, which is easy to cause the electrical clearance between the conducting wire and the tower body not to satisfy the requirement. The arrangement of the elongate member at the outer corner of the angle tower can increase the distance between the two conducting wires and the tower body at the outer corner.

Preferably, said cross arm is a composite cross arm.

An angle tower is also provided according to present disclosure. The angle tower includes the tower body and the cross arm mentioned above. The angle tower can meet the requirement on the electrical clearance between the conducting wire and the tower body without increasing the length of the cross arm.

According to another aspect of present disclosure, a cross arm applied to a tension tower is provided. Said tension tower includes a tower body. An end of said cross arm is connected to said tower body, and another end of said cross arm away from the tower body is a free end for connecting a conducting wire. Said free end is provided with an end connecting member and a jumper device. Said jumper device is horizontally arranged on said end connecting member and configured to be hung with a jumper wire.

The jumper device is horizontally arranged on the end connecting member, then the jumper device will not occupy the vertical space, thus the interlayer spacing of the conducting wires can be narrowed. And the tension insulators and the complicated connections between fittings can be cancelled. Thus the size of the tower head of the tension tower is reduced, the structure is simplified and the cost is reduced.

Preferably, said jumper device is a composite post insulator, an end of said composite post insulator is connected to said end connecting member, and another end of said composite post insulator is hung with said jumper wire. The jumper device is configured as a composite post insulator, which can optimize the electric field of the cross arm.

Preferably, said composite post insulator is hung with said jumper wire by a connecting fitting. It is convenient for connection and installing.

Preferably, said tension tower is an angle tower. Said end connecting member is further connected to an elongate member. In a horizontal projection, said elongate member extends outward from said end connecting member. Said conducting wire is connected to said elongate member. An angle between said elongate member and a center line of said cross arm is greater than an angle between said conducting wire and a center line of said cross arm.

In an angle tower, there is a requirement on the minimum electrical clearance between the conducting wire and the tower body. The electrical clearance is related to the shortest space distance from the conducting wire to the tower body. The minimum electrical clearance can avoid causing the flashover and assure the personal safety. According to the present disclosure, in the horizontal projection, said elongate member extends outward from said free end in a direction parallel with or away from said tower body. The distance between the two hanging points of the two conducting wires on both sides of the tower body can be increased. Then the distance between the conducting wire and the tower body can be increased, that is, the electrical clearance between the conducting wire and the tower body can be increased without changing the length of the cross arm.

Preferably, said elongate member is arranged on both sides of said end connecting member. The two conducting wires on both sides of the tower can be hung on the elongate members arranged on the both sides of the end connecting member, so that the distance between the conducting wire and the tower body can be increased.

Preferably, one said elongate member is arranged on said end connecting member, and two conducting wires on both sides of said tower body are respectively connected to both ends of said elongate member. The elongate member can be mounted on the end connecting member as a whole, which only needs to be fixed to the free end.

Preferably, at least one reinforcing member is arranged on said elongate member. The arrangement of the reinforcing member may enhance the strength and structural stability of the elongate member.

Preferably, said at least one reinforcing member is connected to said elongate member and said end connecting member. The reinforcing member, the elongate member and the end connecting member may form a stable triangular structure that further enhances the strength of the elongate member.

Preferably, said cross arm is a composite cross arm.

A tension tower is provided according to present disclosure. The tension tower includes said tower body and said cross arm. The size of the tower head of the tension tower is small, the material cost is saved and the installation is convenient.

DETAILED DESCRIPTION

Specific embodiments of the present disclosure will be disclosed herein upon request. However, it should be understood that the embodiments disclosed herein are only exemplary examples of the present disclosure and may be embodied in various forms. Accordingly, details disclosed herein are not to be considered as being limiting, but merely serve as a basis of claims and as a representative basis for teaching those skilled in the art to variously apply the disclosure in any appropriate means in practice, including use of the various features disclosed herein and combination with features that might not be explicitly disclosed herein.

A cross arm according to one aspect of the present disclosure will be described below by taking an angle tower as an example.

Example One

Figure 3:
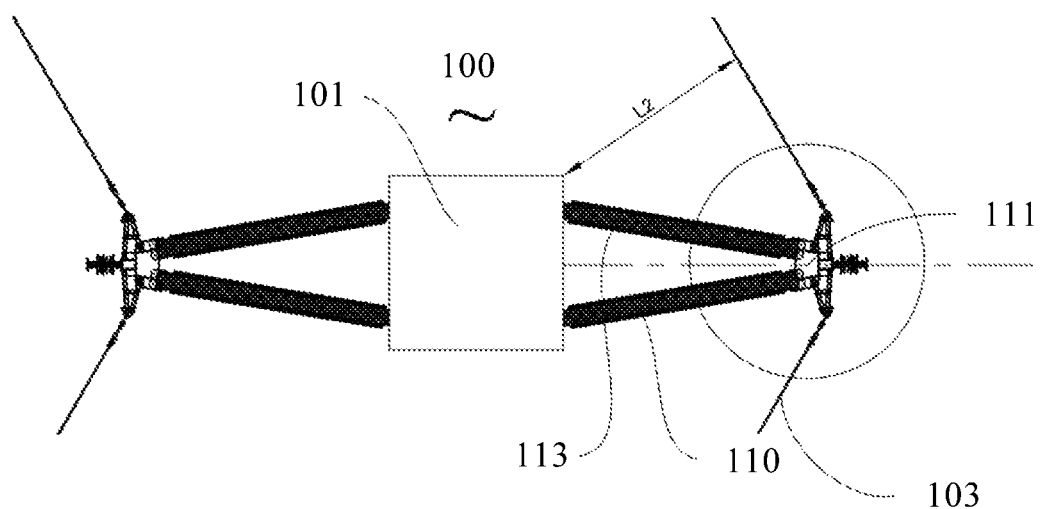
FIG. 3 is a top view of an angle tower according to Example One of the present disclosure.

FIG. 3 is a schematic view showing use of an angle tower 100 at a corner of a line. The angle tower 100 includes a tower body 101 and cross arms 110 arranged on the tower body 101. The conducting wires 103 at the corner are hung on the cross arms 110 respectively. In this example, the conducting wires 103 have a corner angle of 120 degrees.

In this example, the cross arm 110 is a V-shaped composite cross arm with an open end connected to the tower body 101, and an apex serving as a free end which is used to connect the conducting wire 103. The cross arm 110 includes two cross arm insulators 113 and a free end. The two cross arm insulators 113 are fixed by an end fitting 111 at the free end.

Figure 4:
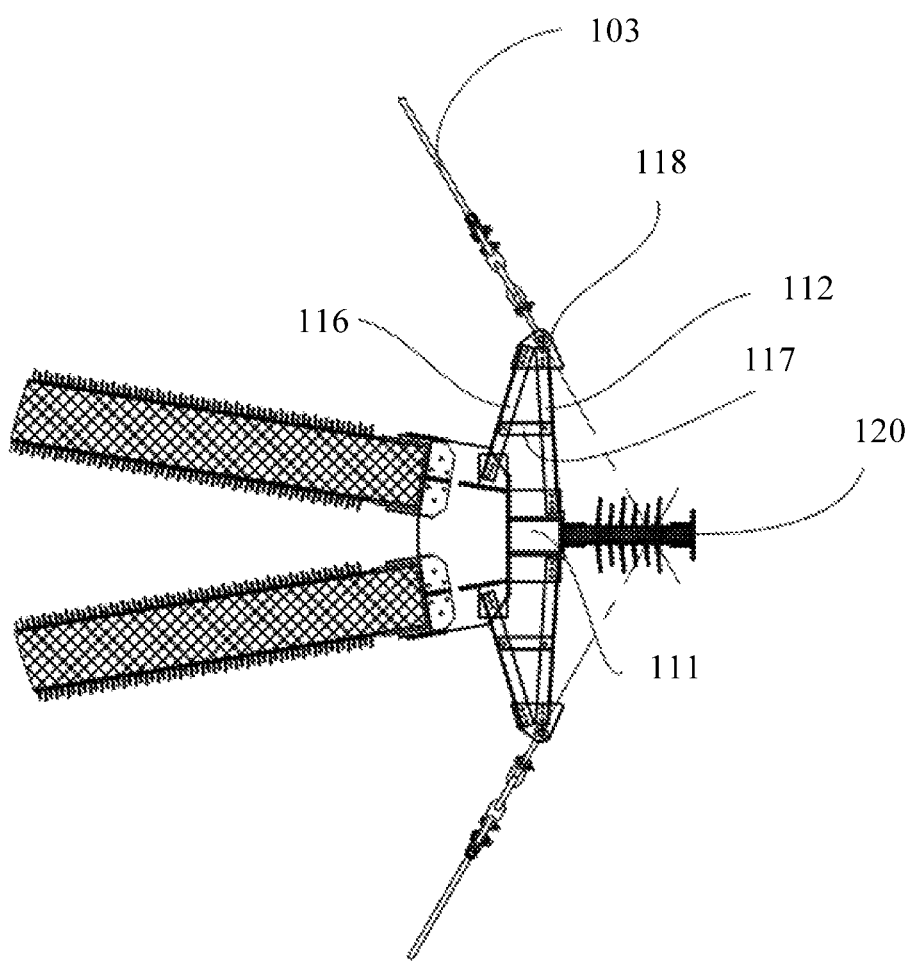
FIG. 4 is a partial enlarged view of a free end of the cross arm shown in FIG. 3.

FIG. 4 shows a partial enlarged view of a free end of the cross arm. The free end of the cross arm includes an end fitting 111, elongate members 112, and a jumper device 120. Specifically, the elongate members 112 are respectively arranged on both sides of the end fitting 111. Each elongate member 112 has an end connected to the end fitting 111 and another end connected to a conducting wire 103 on the same side of the elongate member. The jumper device 120 is fixed to the end fitting 111 for supporting the jumper wire.

In this example, the angle between the conducting wire 103 and a center line of the cross arm 110 is 60 degrees. The elongate member 112 is horizontally arranged at the free end, and an angle between the elongate member 112 and the center line of the cross arm 110 is 90 degrees. The arrangement of the elongate member 112 is equivalent to extend a virtual intersection of the two cornered conducting wires 103 on the same side of the tower body 101. Thus the distance between the conducting wire 103 and the tower body is increased. The electrical clearance between the conducting wire 103 and the tower body 101 can be satisfied without changing the length of the cross arm 110.

Figure 1:
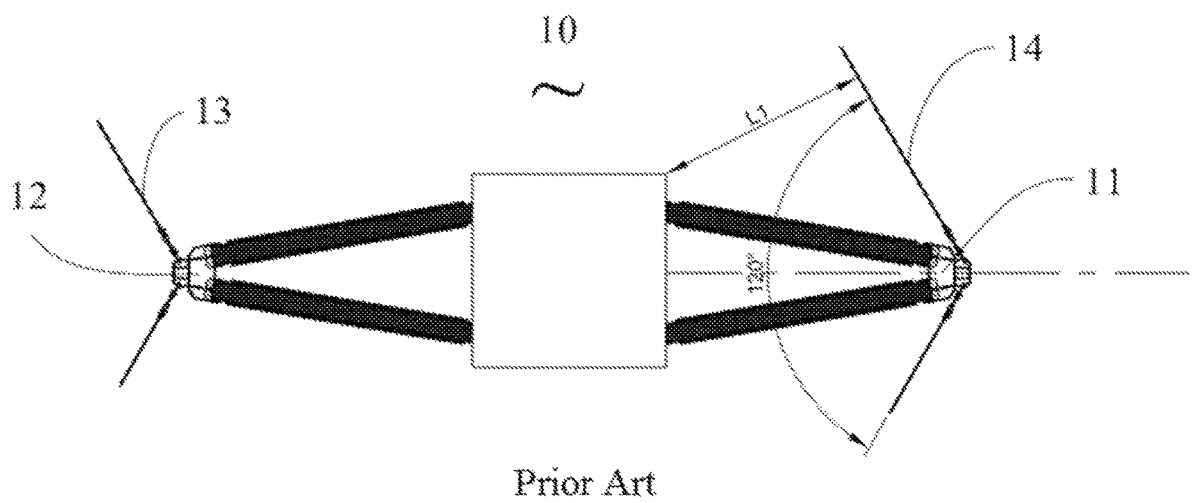
FIG. 1 is a top view of a conventional angle tower.
Figure 2:
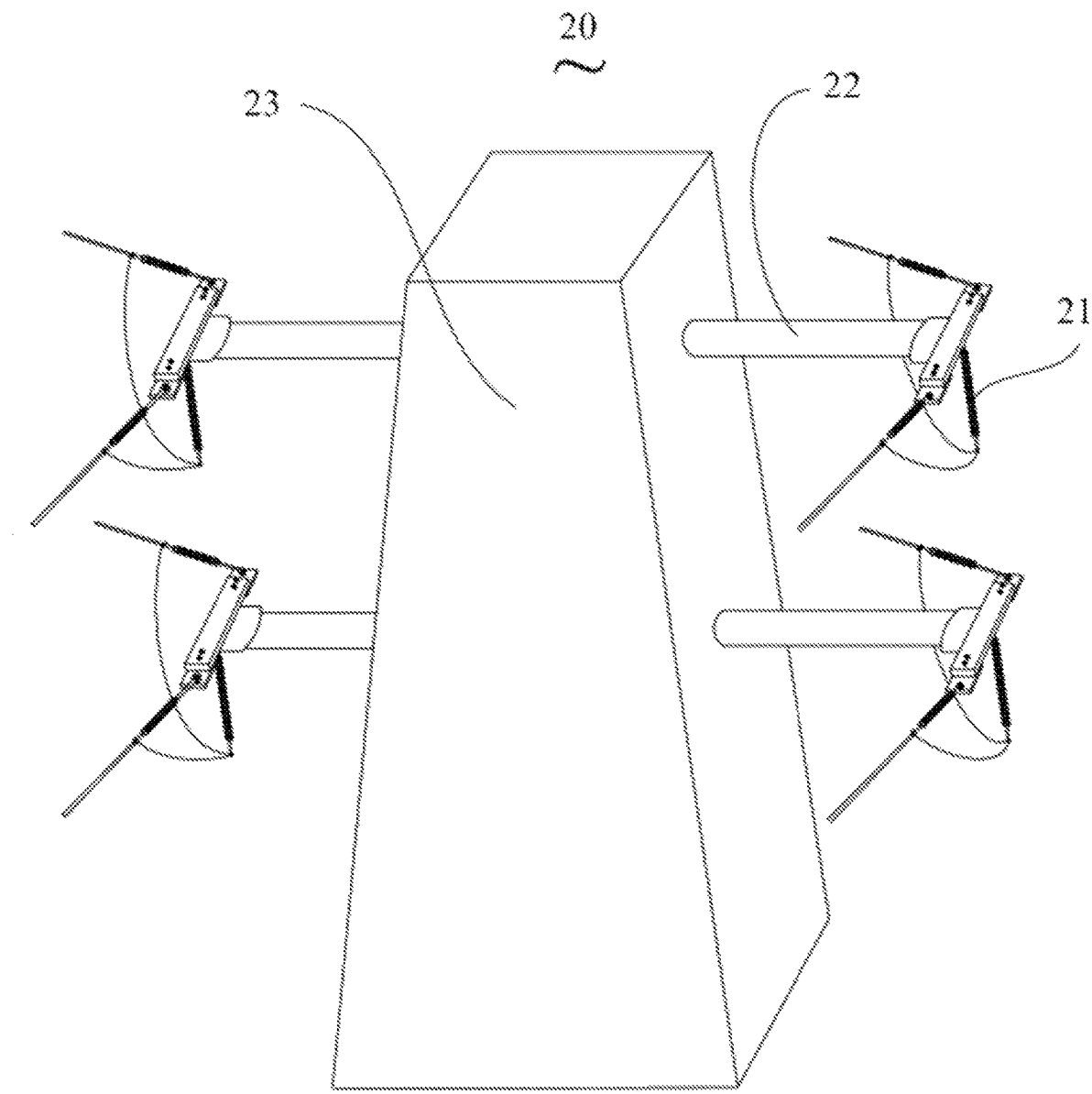
FIG. 2 is a schematic view of a conventional tension tower.

In order to explain intuitively, FIG. 3 may be compared to FIG. 1. FIG. 1 shows an angle tower 10 without an elongate member, while FIG. 3 shows an angle tower 100 with an elongate member 112 according to this embodiment. Both the angle towers in FIG. 1 and FIG. 3 have a same corner angle and a same cross arm length. A distance L2 from the conducting wire 103 to the tower body 101 in FIG. 3 is greater than a distance L1 from the conducting wire 13 to the tower body in FIG. 1.

Alternatively, when drawing a parallel line of the conducting wire 103 with any point on the end fitting 111 as a starting point, it is obviously that the distance from the drawn parallel line to the tower body 101 is smaller than the distance from the conducting wire 103 to the tower body 101. That is, it is easier to satisfy the electrical clearance between the conducting wire and the tower body by using the cross arm provided with the elongate member 112 on the angle tower.

In this embodiment, the elongate member 112 is arranged horizontally at the free end so that the angle between the elongate member 112 and the center line of the cross arm 110 can be compared directly. However, it is obviously that the elongate member can also be not completely in the horizontal plane. The elongate member may be offset by an angle in the vertical plane, as long as in the horizontal projection, the angle between the elongate member and the center line of the cross arm is greater than the angle between the conducting wire on the same side and the center line of the cross arm.

In addition, two reinforcing members are arranged at the free end of the cross arm 110. These two reinforcing members include an inclined member 116 and an auxiliary member 117. The inclined member 116 and the elongate member 112 form a V-shaped structure, that is, the end portions of the inclined member 116 and the elongate member 112 are fixed to a connecting plate 118 to form a V-shaped apex, and the other end of the inclined member 116 is fixed to the end fitting 111. The arrangement of the inclined member 116 enhances the rigidity and strength of the elongate member 112. The auxiliary member 117 is connected to the inclined member 116 and the elongate member 112, thus the V-shaped structure formed by the inclined member 116 and the elongate member 112 is strengthened, and the rigidity and strength of the elongate member 112 are further enhanced.

Due to the use of the elongate member 112, the cross arm 110 is prevented from being too long, so that the angle tower provided with the cross arms 110 can avoid the situation that the electrical clearance between the conducting wires is unsatisfied. The angle tower is light and the line corridor is narrow.

The number of cornered conducting wires is not the inventive point of present disclosure, so the cornered conducting wires may also be split wires. In this example, the elongate member 112 may be arranged at the outer corner of the angle tower 100, but the elongate member 112 may also be arranged at the inner corner. The conducting wire at the outer corner is close to the tower body first and then away from the tower body at the outer corner, while the conducting wire at the corner is directly away from the tower body at the inner corner, therefore, compared to the inner corner, it is more necessary to provide an elongate member at the outer corner.

Example Two

Figure 5:
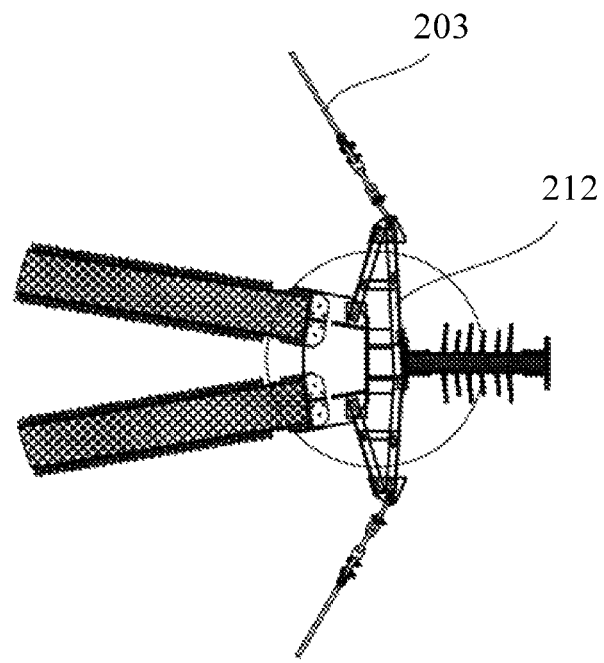
FIG. 5 is a schematic view of a free end of a cross arm according to Example Two of the present disclosure.
Figure 6:
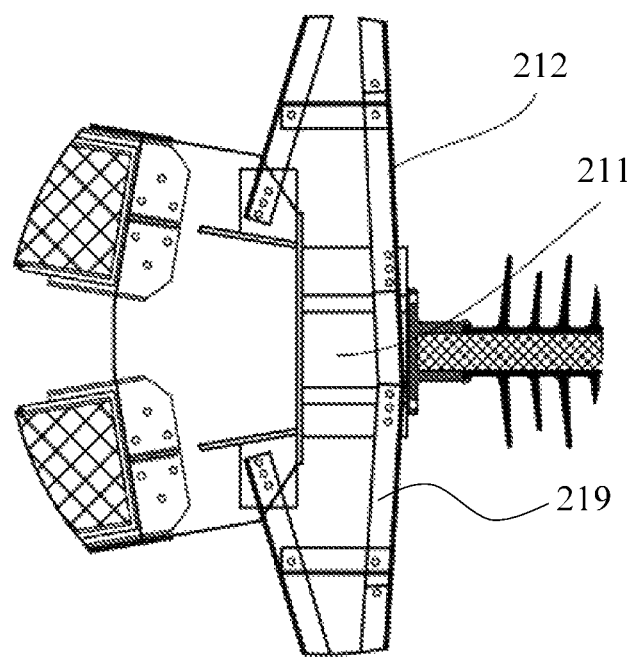
FIG. 6 is an enlarged partial view of a free end of the cross arm shown in FIG. 5.

As shown in FIG. 5 and FIG. 6, in this example, an elongate member 212 is fixed to an end fitting 211 as a whole, and conducting wires 203 at a corner are connected to both ends of the elongate member 212, respectively. In contrast to the Example One, the elongate member 212 in this example is formed by joining five supports 219 with different lengths. An appropriate number of supports may be chosen to assemble an elongate member with a desired length as required to meet the electrical clearance between the conducting wire and the tower body. In addition, when the elongate member needs to be long, it is flexible for assembly in a form of multi-segment supports. In this example, a reinforcing member and an auxiliary member are also arranged at the free end of the cross arm, whose functions and structures are the same as those in the Example One, and are not be described in detail herein.

Example Three

Figure 7:
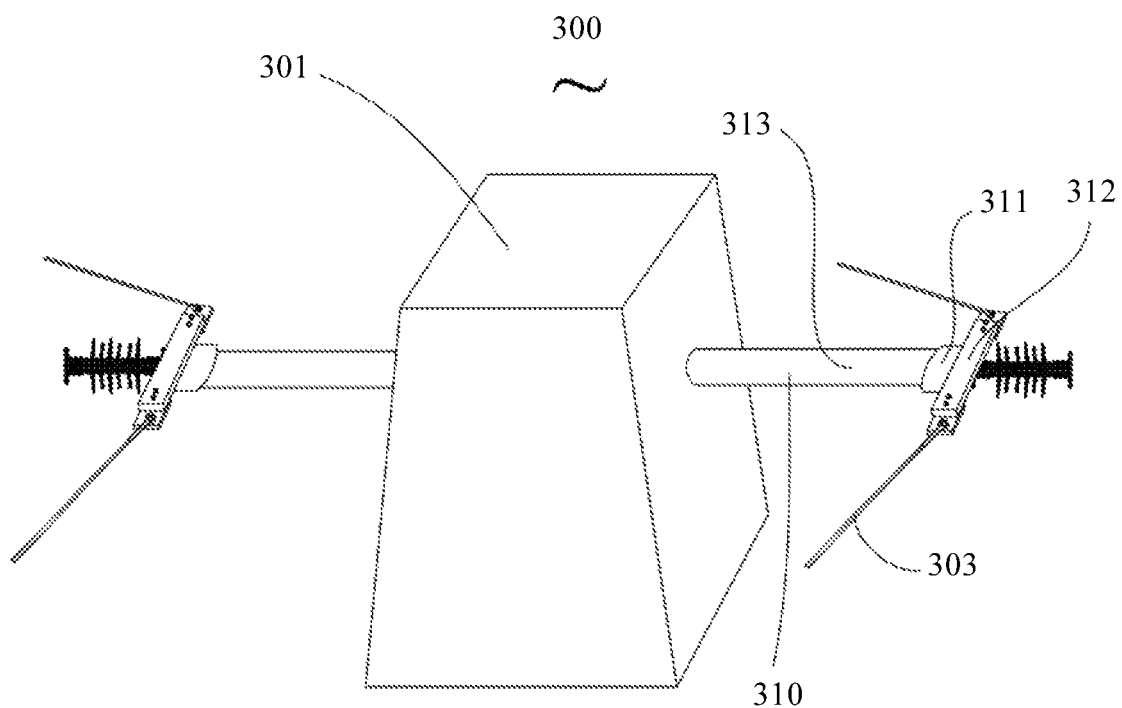
FIG. 7 is a schematic view of an angle tower according to Example Three of the present disclosure.

The elongate member provided in the present disclosure does not limit the cross-member structure, the material, the corner angle of the conducting wire and others, to which it is applied. As shown in FIG. 7, in this example, the cross arm 310 on the angle tower 300 is a line-shaped cross arm. The conducting wire 303 has a corner angle of 100 degrees, and an angle between the conducting wire 303 at the corner and the center line of the cross arm 310 is 50 degrees. In this example, elongate members are arranged at both the inner and outer corners.

Specifically, the cross arm 310 includes a cross arm insulator 313 and a free end away from the tower body 301. The free end includes an end fitting 311 and an elongate member 312 connected to the end fitting 311. The elongate member 312 is a rectangular plate having an inclination angle of 60 degrees in a vertical plane, and two angles of 70 degrees and 110 degrees relative to the center line of the cross arm 310 respectively. Since any angle between the elongate member 312 and the center line of the cross arm 310 is greater than the angle between the conducting wire 303 and the center line of the cross arm 310, the cross arm 310 in this example can satisfy the electrical clearance between the conducting wire 303 and the tower body 301.

In this example, an end of the end fitting 311 is a sleeve bonded to the cross arm insulator 313. Another end of the end fitting 311 is a connecting plate fixed to the elongate member 312. The end fitting may include any suitable connecting member that is fixable to the elongate member as known to those skilled in the art. Further, the conducting wire may be connected to the elongate member by any appropriate connecting means known to those skilled in the art, for example, by being hooked through a wire clamp.

Hereinafter, a cross arm according to another aspect of the present disclosure will be described with an example of a tension tower.

Example Four

Figure 8:
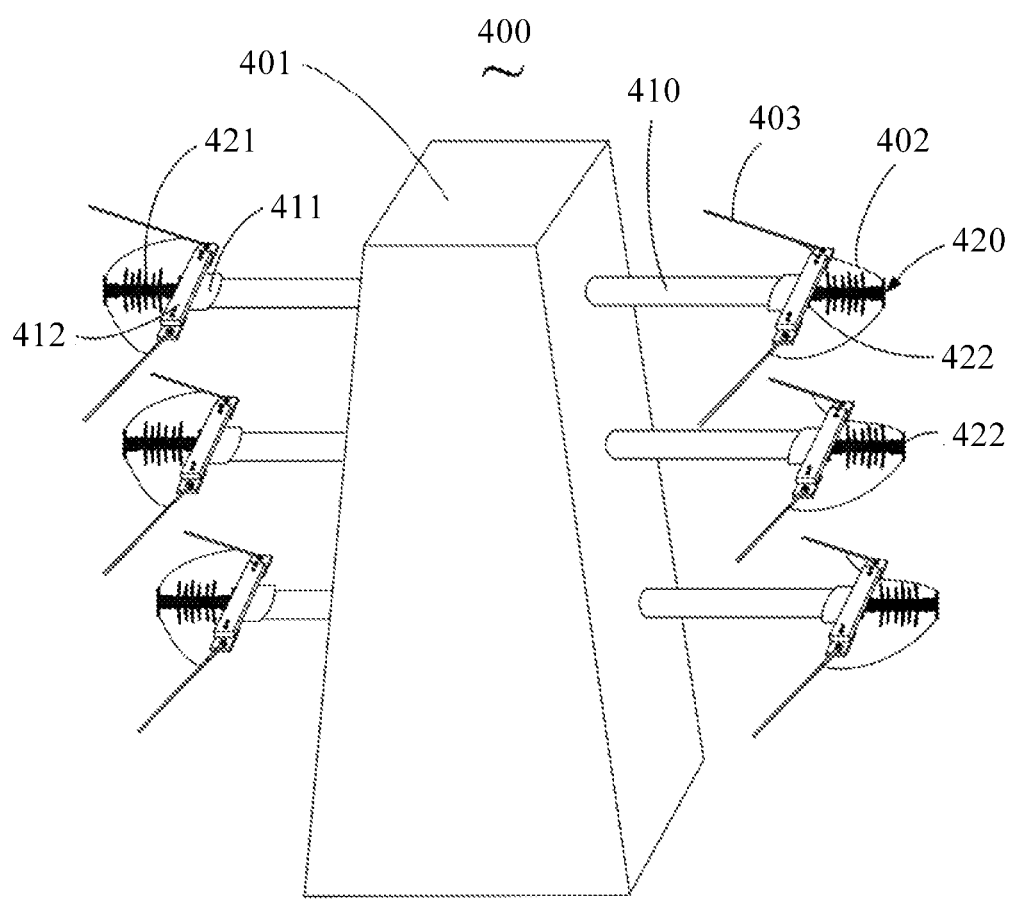
FIG. 8 is a schematic view of a tension tower according to Example Four of the present disclosure.

As shown in FIG. 8, in this example, the tension tower 400 is used for a double-circuit power transmission line and is also used to change the line direction, so it can also be regarded as an angle tower. The tension tower 400 as an angle tower includes a tower body 401, and six cross arms 410 arranged on the tension tower 400 for connecting three-phase conducting wires, respectively. An end of the cross arm 410 is connected to the tower body 401, and another end of the cross arm 410 away from the tower body 401 is a free end for connecting the conducting wire 403. The free end of the cross arm 410 is provided with an end connecting member 411 and a jumper device 420. The jumper device 420 is horizontally arranged on the end connecting member 411 for being hung with the jumper wire 402. In this example, the arrangement of the jumper device 420 replaces the tension insulator strings and complex fitting connection configurations associated in the prior art. The vertical distance between the cross arms of each phase is reduced, thereby the size of the tower head of the tension tower 400 is reduced too. The material of the tower body 401 is saved, the structure is simplified, and the cost is reduced.

Specifically, the tower body 401 may be a lattice type iron tower, or may be a rod body, or other forms of transmission tower structure such as a composite tower. In this example, the jumper device 420 includes a composite post insulator 421. The composite post insulator 421 includes an inner core rod and sheds outside the core rod. The core rod is molded by pultrusion of glass fiber impregnated with epoxy resin. The sheds are made of high temperature vulcanized silicone rubber and molded by integral vacuum injection outside the core rod. Both ends of the composite post insulator 421 are glue-mounted flanges 422 for connecting the end connecting member 411 or wire clamps, so that the jumper wires 402 can be hung up.

As shown in FIG. 8, in this example, the flange 422 at one end of the composite post insulator 421 is connected to the end connecting member 411, for example, by means of bolting, welding, etc. The composite post insulator 421 extends horizontally from the end connecting member 411 in a direction away from the tower body 401, and a jumper wire 402 is directly hung to the flange 422 at the other end. The middle portion of the jumper wire 402 is hung on the composite post insulator 421. Two ends of the jumper wire 402 are connected to the cornered conducting wires 403 on both sides of the cross arm. Therefore the conducting wires are connected.

The conventional tension insulator string is hung at the end portion of the cross arm and is vertically arranged between two adjacent cross arms. By contrast, the arrangement of the composite post insulator 421 in the present disclosure can eliminate the tension insulator string. Since the composite post insulator 421 is horizontally arranged on the end connecting member 411, the composite post insulator 421 itself does not occupy any vertical distance between adjacent upper and lower cross arms of different phases. In the vertical plane, the jumper wire 402 only sags in a small radian. Therefore, there is no need to provide a large vertical space between adjacent upper and lower cross arms, so that the upper, middle and lower three-phase cross arms can be arranged more compactly under the condition of satisfying the electrical performance requirements. Then the size of the tower head of the tension tower 400 can be smaller, thus the structure is simplified and the cost is reduced.

In this example, each phase of cross arm 410 of the tension tower 400 includes a composite post insulator 421. Obviously, there may be only one phase or two phases of cross arms 100 including the composite post insulator 421 in the tension tower 400. When the tension tower 400 is used for a single circuit transmission line or more than one transmission lines, it is only necessary to provide a corresponding number of cross arms 410 according to actual operating conditions. In addition, when the tension tower is a line tension tower or a terminal tower, the same jumper device 420 may be also applied, and it only needs to arrange the conducting wires 403 according to actual usage, which will not be described in detail herein. Instead of using the composite post insulator 421, the jumper device 420 may use other forms of insulation members for connecting the jumper wire 402 as long as it can meet the actual use requirements.

As shown in FIG. 8, an elongate member 412 is also connected to the end connecting member 411. In the horizontal projection, the elongate member 412 extends outward from the end connecting member 411. Two conducting wires 403 on both sides of the tower body are respectively connected to both ends of the elongate member 412. In this example, the elongate member 412 is arranged horizontally on the end connecting member 411 and perpendicular to the composite post insulator 421. The angle between the elongate member 412 and the center line of the cross arm 410 is greater than the angle between the conducting wire 403 and the center line of the cross arm 410.

In this example, the angle between the conducting wire 403 and the center line of the cross arm 410 is 60 degrees, and the angle between the elongate member 412 and the center line of the cross arm 410 is 90 degrees. The arrangement of the elongate member 412 is to be equivalent to extend the virtual intersection of the two cornered conducting wires 403 on the same side of the tower body 401. Thus the distance from the conducting wire 403 to the tower body 401 is increased. The electrical clearance between the conducting wire 403 and the tower body 401 is satisfied without changing the length of the cross arm 410, and the cross arm 410 is prevented from being excessively long.

In this example, the elongate member 412 is horizontally arranged on the end connecting member 411, so that the angle between the elongate member 412 and the center line of the cross arm 410 can be compared directly. However, it is obviously that the elongate member may also be not completely in the horizontal plane. The elongate member 412 may be offset by an angle in the vertical plane, as long as in the horizontal projection, the angle between the elongate member 412 and the center line of the cross arm 410 is greater than the angle between the conducting wire 403 on the same side and the center line of the cross arm 410.

In this example, an end of the end connecting member 411 is a sleeve bonded to the cross arm 410. Another end of the end connecting member 411 is a connecting plate (not shown), which is connected and fixed to the elongate member 412. The end connecting member 411 may include any suitable connecting member that is fixable to the elongate member 412 as known to those skilled in the art, which will not be described in detail herein. Further, the conducting wire 403 may be connected to the elongate member 412 by any appropriate connecting means known to those skilled in the art, for example, by being hooked through a wire clamp.

Example Five

Figure 9:
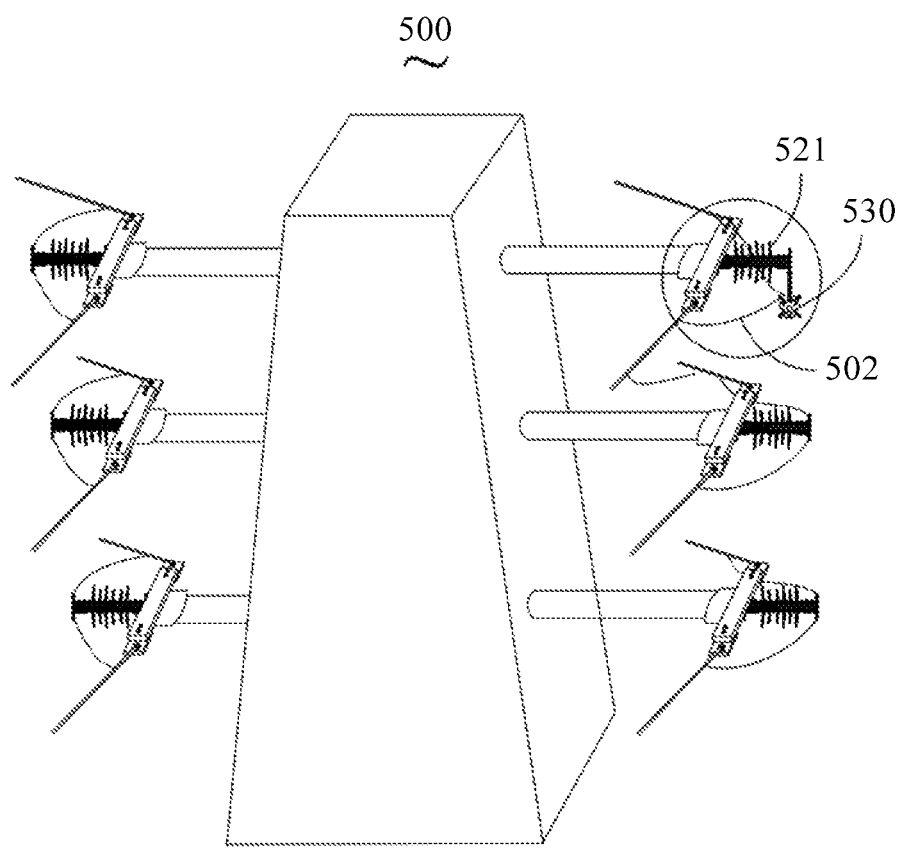
FIG. 9 is a schematic view of a tension tower according to Example Five of the present disclosure.

As shown in FIG. 9, the tension tower 500 in this example is substantially the same as the tension tower 400 in the Example Four, except that a jumper wire 502 is hung to a composite post insulator 521 through a connecting fitting 530.

Figure 10:
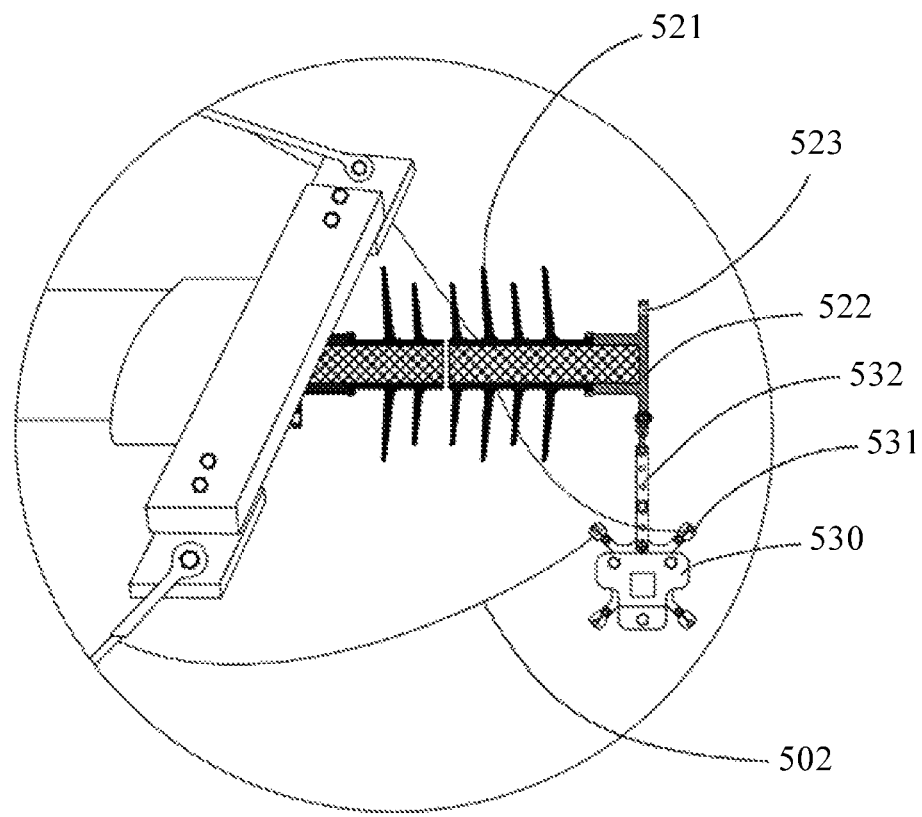
FIG. 10 is a partial enlarged view of a free end of the cross arm shown in FIG. 9.

Specifically, as shown in FIG. 10, the flange 522 at the end of the composite post insulator 521 is provided with a connecting hole 523, through which the connecting fitting 530 is connected. At least two wire clamps 531 are arranged on the connecting fitting 530, and the at least two wire clamps 531 can clamp the jumper wire 502. In this example, the wire clamps 531 and the connecting fitting 530 may adopt any suitable existing configurations, as long as the connection can be realized, which will not be described in detail herein.

An adjusting member 532 may also be arranged between the connecting fitting 530 and the flange 522 for adjusting the distance between the connecting fitting 530 and the composite post insulator 521 to meet the requirements of different operating conditions. The adjusting member 532 is strip-shaped plate, and a plurality of spaced through holes are arranged along the longitudinal direction of the adjusting member 532. The distance between the connecting fitting 530 and the composite post insulator 521 can be adjusted by connecting the connecting fitting 530 to different through holes on the adjusting member 532. Of course, the adjusting member 532 may take other forms. For example, an end portion of one of the adjusting member 532 and the connecting fitting 530 may be provided with a threaded rod, and the other end portion may be provided with a thread cooperated with the threaded rod. The threaded rod may be screwed on the thread and the screwing length may be adjusted, so that the distance between the connecting fitting and the composite post insulator can be adjusted by screwing the threaded rod on the thread by different lengths.

Example Six

Figure 11:
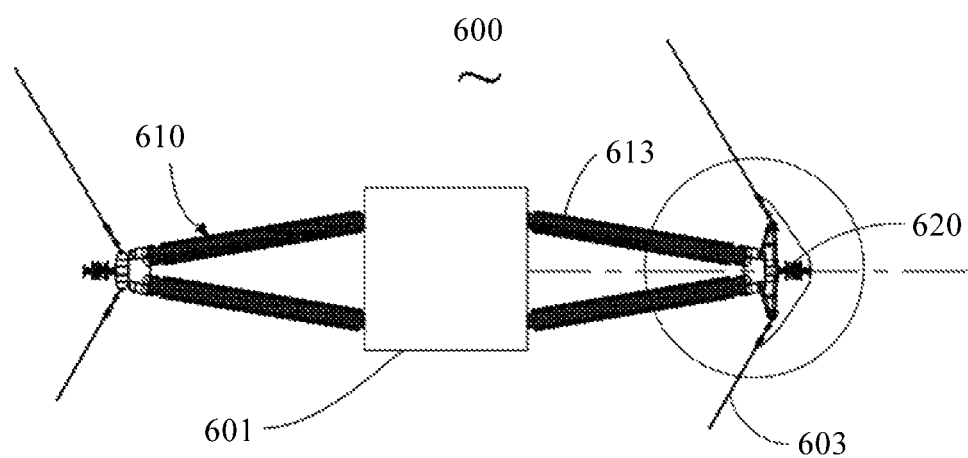
FIG. 11 is a top view of a tension tower according to Example Six of the present disclosure.
Figure 12:
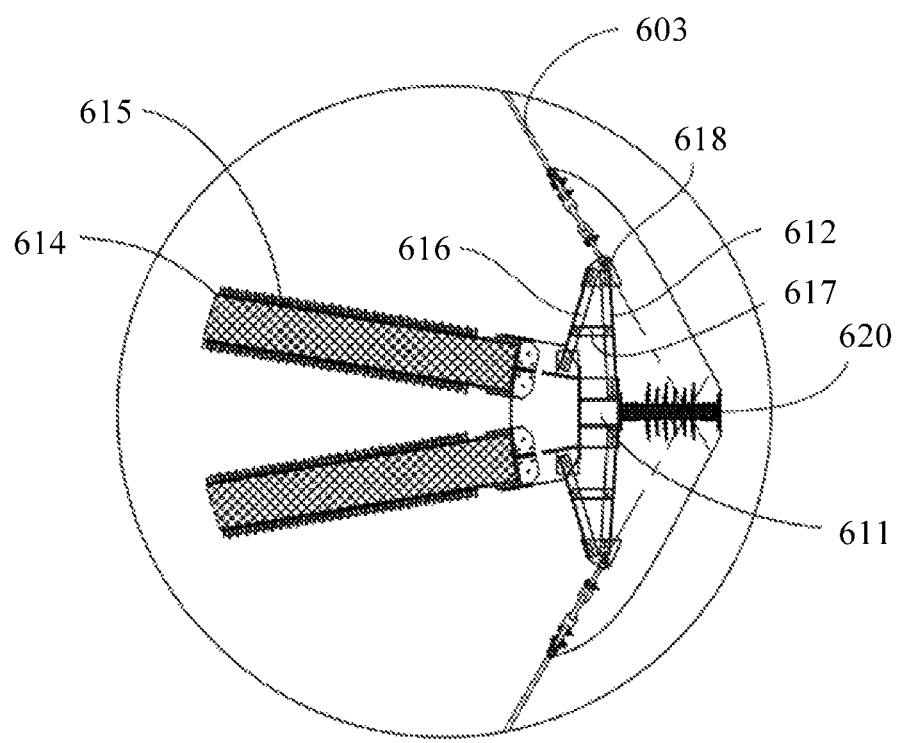
FIG. 12 is an enlarged partial view of a free end of the cross arm shown in FIG. 11.

As shown in FIG. 11 and FIG. 12, in this example, the tension tower 600 in this example is substantially the same as the tension tower 400 in the Example Four, except that the cross arm 610 is a V-shaped composite cross arm. The opening of the V-shaped composite cross arm is connected to the tower body 601, and the V-shaped composite cross arm includes an end connecting member 611, elongate members 612 and a jumper device 620 at the vertex of the V-shape. The elongate members 612 are respectively arranged on both sides of the end connecting member 611, and the jumper device 620 is horizontally arranged on the end connecting member 611.

The cross arm 610 includes two composite cross arm insulators 613. Each composite cross arm insulator 613 includes an insulating tube 614 and silicone rubber sheds 615 outside the insulating tube 614. The insulating tube 614 may be filled with insulating gas such as $SF_6$, or may be filled with polyurethane foam. The two composite cross arm insulators 613 are fixedly connected together at the vertex of the V-shape by the end connecting member 611.

Two elongate members 612 are arranged on both sides of the end connecting member 611 respectively, and the two conducting wires 603 at the corner are respectively hung on the two elongate members 612. In this example, the angle between the conducting wire 603 and the center line of the cross arm 610 is 50 degrees, and the angle between the elongate member 612 and the center line of the cross arm 610 is 70 degrees. The arrangement of the elongate member 612 is equivalent to extend the virtual intersection of the two cornered conducting wires 603 on the same side of the tower body 601, so that the distance from the conducting wire 603 connected to the cross arm 610 hung by the elongate member 611 to the tower body 601 is increased. The cross arm 610 is prevented from being excessively long under the condition of satisfying the electrical insulation distance requirements.

In addition, two reinforcing members are arranged at the free end of the cross arm 610. The two reinforcing members include inclined members 616 and auxiliary members 617. The inclined member 616 and the elongate member 612 form a V-shaped structure. That is, the end portions of the inclined member 616 and the elongate member 612 are fixed to a connecting plate 618 to form a V-shaped apex. The other end of the inclined member 616 is fixed to the end connecting member 611. The arrangement of the inclined member 616 enhances the rigidity and strength of the elongate member 612. The auxiliary member 617 is connected to the inclined member 616 and the elongate member 612, thus the V-shaped structure formed by the inclined member 616 and the elongate member 612 is strengthened, i.e., to further enhance rigidity and strength of the elongate member 612.

Due to the use of the elongate member 612, the cross arm 610 is prevented from being excessively long, so that the tension tower 600 provided with the cross arm 610 can avoid the situation that the requirement on the electrical clearance between the conducting wire 603 and the tension tower 600 is unsatisfied. The tension tower is light and the line corridor is narrow. Besides, the number of cornered conducting wires 603 may be any appropriate number, and the cornered conducting wires 603 may also be bundled conducting wires.

It will be understood by those skilled in the art that the cross arms in the angle towers described in Examples One to Three can be applied to the tension towers, and similarly, the cross arms in the tension towers described in Examples Three to Six can also be applied to the angle towers.

The above-described embodiments represent only several embodiments of the present disclosure, and the description of which is more specific and detailed. But it is not to be construed as limiting the scope of the present patent. It should be noted that, for those of ordinary skill in the art, several modifications and improvements can be made without departing from the concept of the present disclosure, which may fall within the scope of protection of the present disclosure as well. Therefore, the scope of the disclosure is to be determined by the appended claims.

What is claimed is:

1. A cross arm, applied to an angle tower comprising a tower body, an end of said cross arm being connected to said tower body, another end of said cross arm away from said tower body being a free end for connecting a conducting wire, wherein:
   said free end comprises an end connecting member and an elongate member fixed to said end connecting member, and said elongate member is set in a horizontal plane or offset by an angle in the vertical plane;
   in a horizontal projection, said elongate member extends outward from said end connecting member;
   said conducting wire is connected to said elongate member; and
   an angle between said elongate member and a center line of said cross arm is greater than an angle between said conducting wire and said center line of said cross arm.

2. The cross arm according to claim 1, wherein said elongate member is arranged on both sides of said end connecting member.

3. The cross arm according to claim 1, wherein one said elongate member is arranged on said end connecting member, and two conducting wires at a corner are connected to both ends of said elongate member respectively.

4. The cross arm according to claim 1, wherein said elongate member is joined by a plurality of segments of supports.

5. The cross arm according to claim 1, wherein at least one reinforcing member is arranged on said elongate member.

6. The cross arm according to claim 5, wherein said at least one reinforcing member is connected to said elongate member and said end connecting member.

7. The cross arm according to claim 5, wherein at least one auxiliary member is arranged between said reinforcing member and said elongate member, and said auxiliary member is connected to said reinforcing member and said elongate member.

8. The cross arm according to claim 1, wherein said elongate member is arranged at an outer corner of said angle tower.

9. The cross arm according to claim 1, wherein said cross arm is a composite cross arm.

10. An angle tower, comprising a tower body, wherein said angle tower further comprises said cross arm according to claim 1.

11. A cross arm, applied to a tension tower comprising a tower body, an end of said cross arm being connected to said tower body, and another end of said cross arm away from the tower body being a free end for connecting a conducting wire, wherein:
    said free end is provided with an end connecting member, and a jumper device horizontally arranged on said end connecting member and configured to be hung with a jumper wire;
    said tension tower is an angle tower;
    said end connecting member is further connected to an elongate member, and said elongate member is set in a horizontal plane or offset by an angle in the vertical plane;
    in a horizontal projection, said elongate member extends outward from said end connecting member;
    said conducting wire is connected to said elongate member; and
    an angle between said elongate member and a center line of said cross arm is greater than an angle between said conducting wire and said center line of said cross arm.

12. The cross arm according to claim 11, wherein said jumper device is a composite post insulator, an end of said composite post insulator is connected to said end connecting member, and another end of said composite post insulator is hung with said jumper wire.

13. The cross arm according to claim 12, wherein said composite post insulator is hung with said jumper wire by a connecting fitting.

14. The cross arm according to claim 11, wherein said elongate member is arranged on both sides of said end connecting member.

15. The cross arm according to claim 11, wherein one said elongate member is arranged on said end connecting member, and two conducting wires on both sides of said tower body are respectively connected to both ends of said elongate member.

16. The cross arm according to claim 11, wherein at least one reinforcing member is arranged on said elongate member.

17. The cross arm according to claim 16, wherein said at least one reinforcing member is connected to said elongate member and said end connecting member.

18. The cross arm according to claim 11, wherein said cross arm is a composite cross arm.

19. A tension tower comprising a tower body, wherein said tension tower further comprises said cross arm according to claim 11.

* * * * *